United States Patent
Lynar et al.

(10) Patent No.: US 8,818,670 B2
(45) Date of Patent: Aug. 26, 2014

(54) WEAR LEVELING FOR ROAD LIFE OPTIMIZATION

(75) Inventors: Timothy M. Lynar, Carlton Vic (AU); Kent C. Steer, Carlton Vic (AU)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/540,823

(22) Filed: Jul. 3, 2012

(65) Prior Publication Data

US 2014/0012432 A1 Jan. 9, 2014

(51) Int. Cl.
- G05D 1/02 (2006.01)
- G08G 1/0967 (2006.01)
- B60K 31/00 (2006.01)

(52) U.S. Cl.
CPC ........ G05D 1/0223 (2013.01); G08G 1/096725 (2013.01); B60K 31/0058 (2013.01)
USPC .................. 701/70; 701/24; 180/167; 180/168

(58) Field of Classification Search
CPC .................................................. G05D 1/0223
See application file for complete search history.

(56) References Cited

U.S. PATENT DOCUMENTS

| | | | |
|---|---|---|---|
| 5,938,707 A | 8/1999 | Uehara | |
| 6,442,456 B2 * | 8/2002 | Burns et al. | 701/23 |
| 7,708,493 B2 * | 5/2010 | Jung et al. | 404/12 |
| 8,374,743 B2 * | 2/2013 | Salinger | 701/23 |
| 8,515,610 B2 * | 8/2013 | Sung et al. | 701/23 |
| 8,583,341 B2 * | 11/2013 | Stahlin et al. | 701/75 |
| 2007/0098493 A1 | 5/2007 | Moore | |
| 2013/0311041 A1 * | 11/2013 | Lynar et al. | 701/41 |

FOREIGN PATENT DOCUMENTS

JP 11283176 A 10/1999

* cited by examiner

*Primary Examiner* — John R Olszewski
*Assistant Examiner* — Todd Melton
(74) *Attorney, Agent, or Firm* — Tutunjian & Bitetto, P.C.; Vazken Alexanian (57) ABSTRACT

There are provided methods and systems for road wear leveling. A method includes determining a location of a velocity change point based on wear leveling information for a road segment including the location. The method further includes communicating the location of the velocity change point to a vehicle.

25 Claims, 9 Drawing Sheets

WEAR LEVELING FOR ROAD LIFE OPTIMIZATION

BACKGROUND

1. Technical Field

The present principles relate generally to vehicle infrastructure and, in particular, to wear leveling for road life optimization.

2. Description of the Related Art

Figure 1:
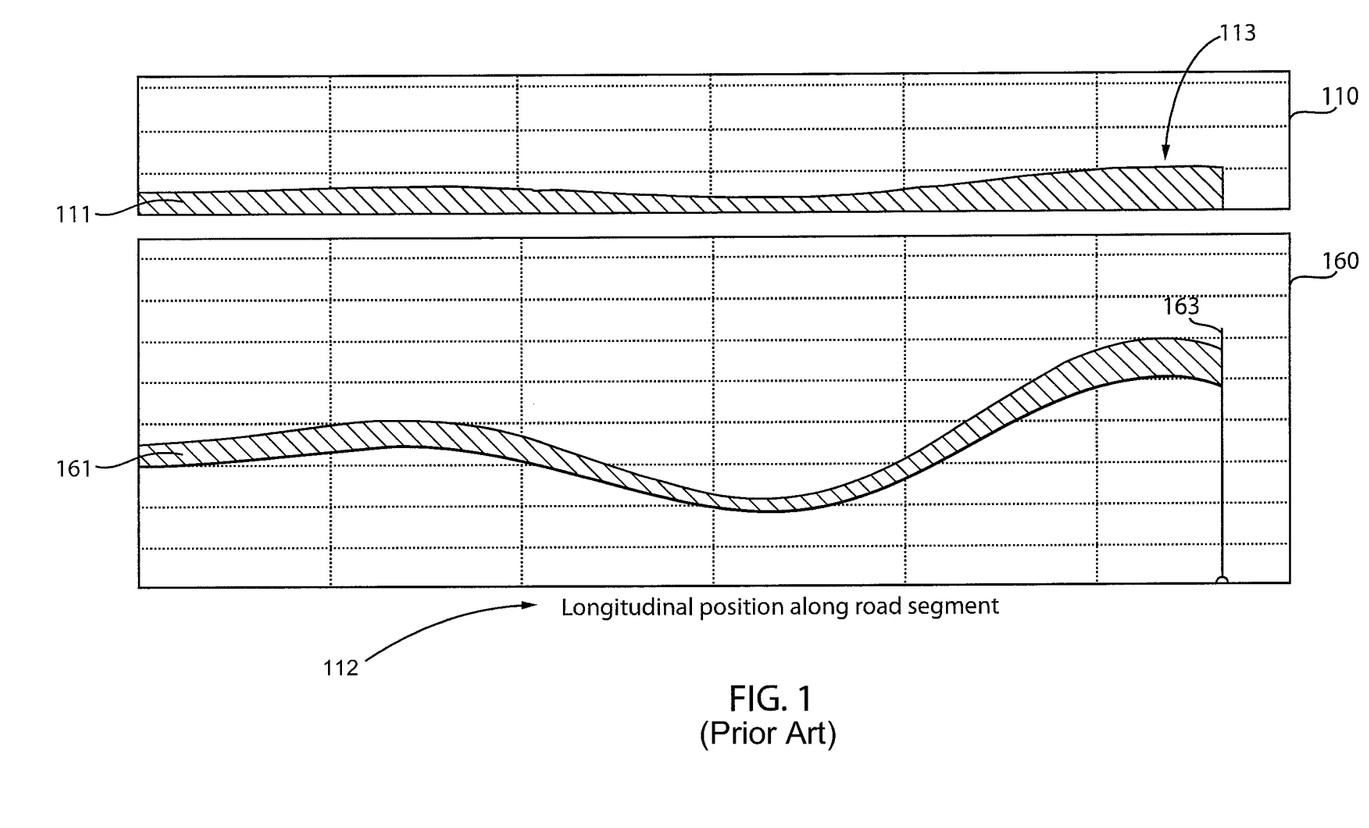
FIG. 1 shows two related graphs representing the current practice of allowing wear to build up in one area, in accordance with the prior art.

The passage of any vehicle over a road can be associated with an incremental wear profile. One of the primary determinants of this wear profile is the location of velocity change points. Velocity change points include stop signs, give way signs, traffic lights, speed limit change points (e.g., when the speed limit drops from 100 km/h to 60 km/h upon entering a built-up area), and so forth. FIG. 1 shows two related graphs representing the current practice of allowing wear to build up in one area. The first graph 110 shows the nominal incremental wear profile 111 versus the longitudinal position along the road segment 112, as well as the peak wear 113. The second graph 160 shows the cumulative wear profile 161 versus the longitudinal position along the road segment 112, as well as a traffic signal 163 which essentially results in the peak wear 113 at the shown location 114 in the first graph 110. Over time the non-uniform profile leads to failure in the high-wear regions, while the low-wear regions remain in good condition. However, maintenance action is triggered by the most worn region. Further, while localized repairs can be performed on high-wear regions, the cost of sending a crew to the site and closing the road means it is economically advantageous to replace large segments at low frequency when compared to repairing small segments at high frequency.

SUMMARY

According to an aspect of the present principles, a road wear leveling method is provided. The method includes determining a location of a velocity change point based on wear leveling information for a road segment including the location. The method further includes communicating the location of the velocity change point to a vehicle.

According to another aspect of the present principles, a road wear leveling system is provided. The system includes a velocity change point determining unit for determining a location of a velocity change point based on wear leveling information for a road segment including the location. The system further includes a communication system for communicating the location of the velocity change point to a driver of the vehicle.

According to yet another aspect of the present principles, a road wear leveling method is provided. The method includes receiving at least one of vehicle passage information, road maintenance information, road profile measurements, induction loop data from induction loops embedded in the road segment, and normative road wear profiles relating to expected wear condition for the road segment. The method further includes determining a location of a velocity change point based on wear leveling information for a road segment including the location, the wear leveling information determined responsive to said receiving step. The method also includes controlling one or more vehicle functions in accordance with the location of the velocity change point.

According to still another aspect of the present principles, a road wear leveling system is provided. The system includes a receiving device for receiving at least one of vehicle passage information, road maintenance information, road profile measurements, induction loop data from induction loops embedded in the road segment, and normative road wear profiles relating to expected wear condition for the road segment. The system further includes a velocity change point determining unit for determining a location of a velocity change point based on wear leveling information for a road segment including the location, the wear leveling information determined responsive to an output of said receiving device. The system also includes an in-vehicle enforcement system connected to one or more vehicle systems for implementing a velocity change at the determined location.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to wear leveling for road life optimization. The present principles provide systems and methods for leveling wear across a given road segment so as to extend the "time to repair" (maintenance). Thus, as used herein, the phrase "wear leveling" refers to maintaining a consistent level of wear across a given road segment, to the extent possible. Moreover, in preferred embodiments, such wear leveling is performed so as to maximize a time to repair the road segment.

In an embodiment, the present principles determine the optimal location of the velocity change point where the optimum is defined by the point at which the "time to repair" is maximized. This information is then communicated to the vehicles so that they may modify their speed in accordance with the optimal solution. Hence, in an embodiment, the present principles enable the redistribution of vehicle wear so that the cumulative wear profile remains near-uniform. By doing so, we extend the life of the previously most worn region and thereby extend "the time to repair" for the road as a whole. The ultimate achievement is a reduction in the long-term road maintenance costs.

Figure 2:
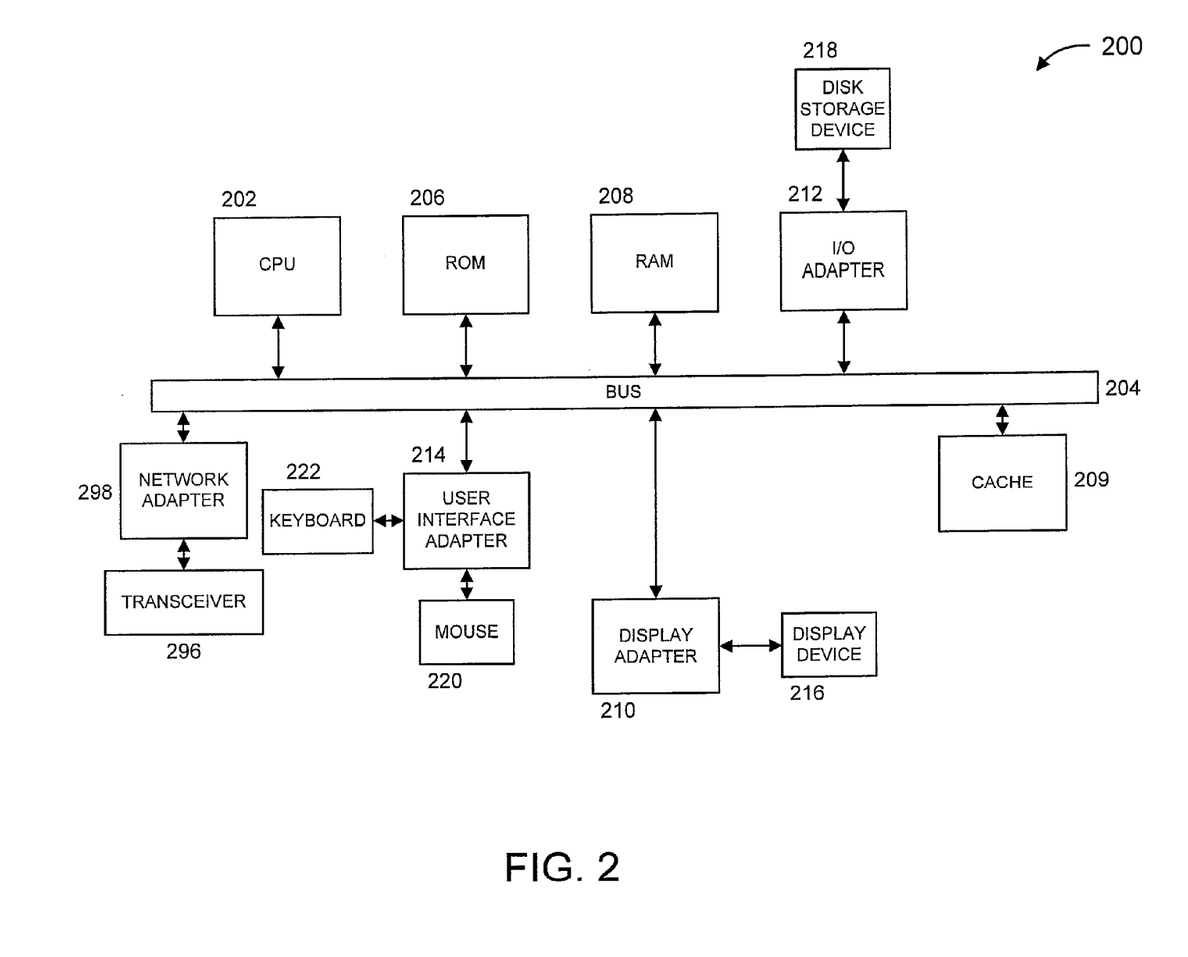
FIG. 2 shows an exemplary processing system 200 to which the present principles may be applied, in accordance with an embodiment of the present principles.

FIG. 2 shows an exemplary processing system 200 to which the present principles may be applied, in accordance with an embodiment of the present principles. The processing system 200 includes at least one processor (CPU) 202 operatively coupled to other components via a system bus 204. A read only memory (ROM) 206, a random access memory (RAM) 208, a display adapter 210, an I/O adapter 212, a user interface adapter 214, and a network adapter 298, are operatively coupled to the system bus 204.

A display device 216 is operatively coupled to system bus 204 by display adapter 210. A disk storage device (e.g., a magnetic or optical disk storage device) 218 is operatively coupled to system bus 204 by I/O adapter 212.

A mouse 220 and keyboard 222 are operatively coupled to system bus 204 by user interface adapter 214. The mouse 220 and keyboard 222 are used to input and output information to and from system 200.

A transceiver 296 is operatively coupled to system bus 204 by network adapter 298.

Of course, the processing system 200 may also include other elements (not shown), as readily contemplated by one of skill in the art, as well as omit certain elements. For example, systems 400, 500, and 600 described below with respect to FIGS. 4, 5, and 6, respectively, are systems for implementing a respective embodiment of the present principles. Part or all of processing system 200 may be implemented in one or more of the elements of systems 400, 500, and 600. In such a case, the transceiver 296 may be replaced by a transmitter or a receiver depending upon the element the processing system 200 or portion thereof is implemented in, connected to, and/or otherwise somehow involved with, as readily contemplated and understood by one of ordinary skill in the art, given the teachings of the present principles provided herein. Thus, when used herein, the term "transceiver" may be replaced by "transmitter" or "receiver" depending on the specific implementation.

Additionally, elements of processing system 200 such as the keyboard 222 and mouse 220 may be omitted with a user interfacing with the processing system via the transceiver 296 and/or display device 216. For example, a processing system 200 implemented at a traffic signal may omit such elements, with a traffic signal technician providing his or her own means of interfacing with the same when the technician is located at the traffic signal, or may access the processing system remotely, for example, through the transceiver 296.

These and other variations of processing system 200 and the elements included therein are readily contemplated by one of ordinary skill in the art, while maintaining the spirit of the present principles.

Figure 3:
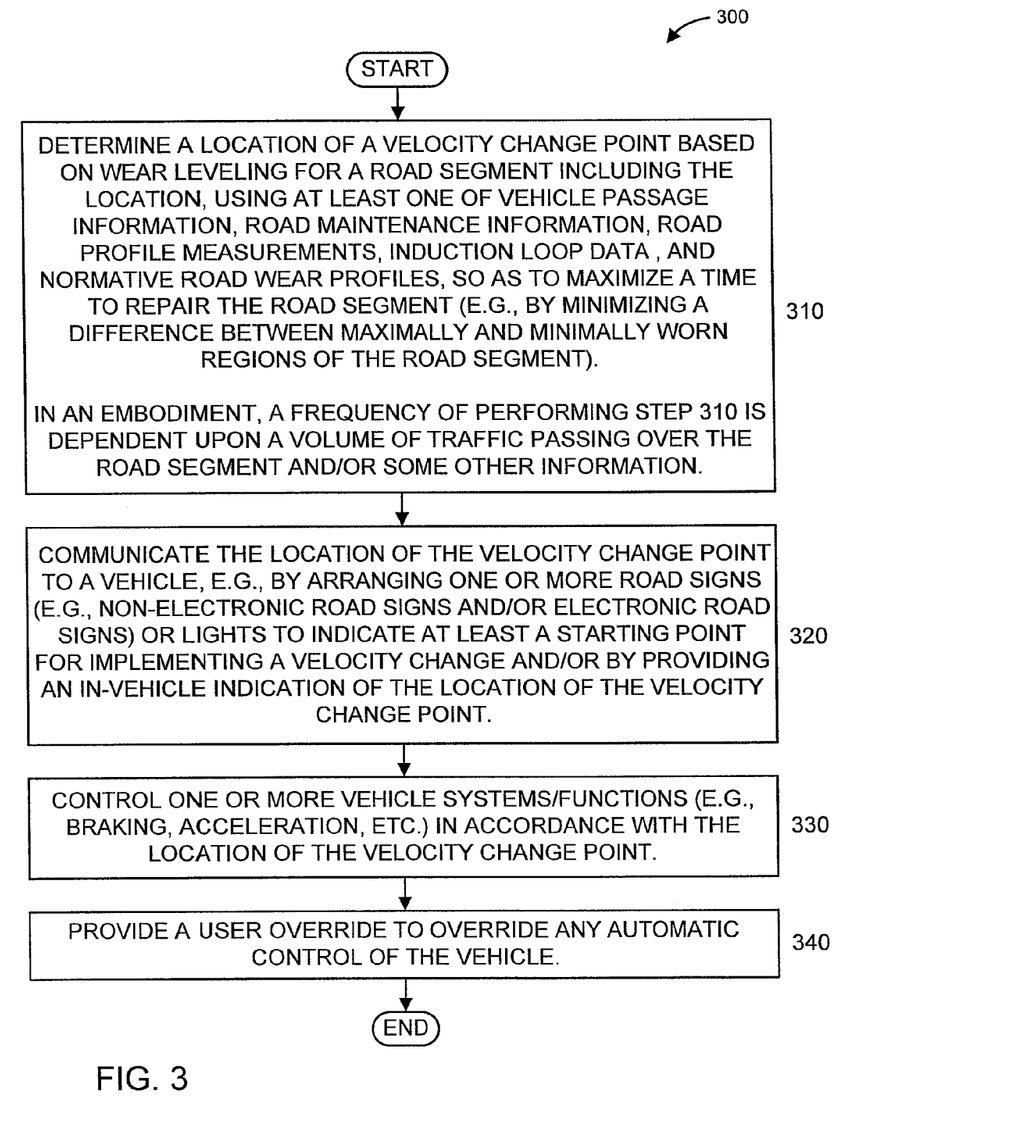
FIG. 3 shows an exemplary method 300 for wear leveling for road life optimization, in accordance with an embodiment of the present principles.

Moreover, it is to be appreciated that processing system 200 may perform at least part of the methods described herein including, for example, parts of method 300 of FIG. 3.

FIG. 3 shows an exemplary method 300 for wear leveling for road life optimization, in accordance with an embodiment of the present principles.

At step 310, a location of a velocity change point is determined based on wear leveling for a road segment including the location, using at least one of vehicle passage information, road maintenance information, road profile measurements, induction loop data from induction loops embedded in the road segment, and normative road wear profiles relating to expected wear condition for the road segment, so as to maximize a time to repair the road segment (e.g., by minimizing a difference between maximally and minimally worn regions of the road segment). In an embodiment, a frequency of performing step 310 is dependent upon a volume of traffic passing over the road segment. Of course, other basis may be used to determine the frequency for performing step 310.

At step 320, the location of the velocity change point is communicated to a vehicle, for example, by arranging one or more road signs (e.g., non-electronic road signs and/or electronic road signs) or lights to indicate at least a starting point for implementing a velocity change and/or by providing an in-vehicle indication of the location of the velocity change point. The latter, i.e., the in-vehicle indication may be acted upon the vehicle itself automatically or by the vehicle operator, as described in further detail herein below.

At step 330, one or more vehicle systems/functions (e.g., braking, acceleration, etc.) are controlled in accordance with the location of the velocity change point. It is to be appreciated that step 330 may performed automatically by the vehicle as described in further detail herein below, or may be performed by the vehicle operator.

At step 340, a user override is provided to override any automatic control of the vehicle, should the same be necessary as determined by the vehicle operator.

A description of an embodiment of the present principles incorporating digital assignment will now be given. Digital assignment is the sending of the velocity change point to the vehicle through a digital medium. Where driverless vehicles are concerned, the digital assignment would offer one of the most cost effective and reliable physical embodiments. Optimal velocity change points could be decimated either offline or online. In an offline system, the velocity change points would be retrieved from an online database at regular intervals. In an online system, a signal would be sent by a road side signal sender to each vehicle informing the vehicle of the optimal velocity change point to prolong the life of each segment of road.

Figure 4:
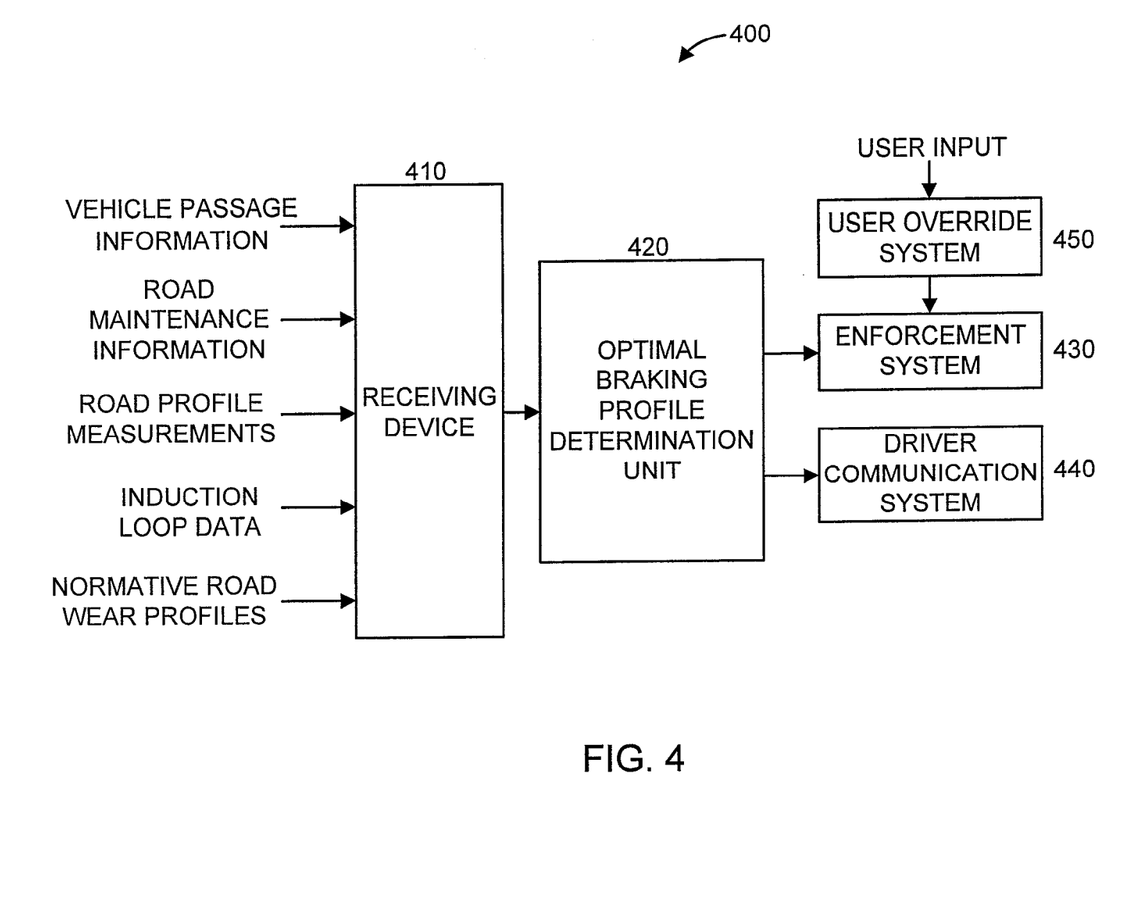
FIG. 4 shows an exemplary system 400 for wear leveling for road life optimization, in accordance with an embodiment of the present principles.

FIG. 4 shows an exemplary system 400 for wear leveling for road life optimization, in accordance with an embodiment of the present principles. The system 400 includes a receiving device 410, an optimal braking profile determination unit 420 (also interchangeably referred to herein as a velocity change point determination device), an enforcement system 430, a driver communication system 440, a user override system 450, a transmitting device (not shown, see, e.g., FIG. 5), and a cumulative wear determination device (not shown, see, e.g., FIG. 5).

As used herein with respect to the embodiment of FIG. 4 as well as the other described embodiments, a receiving device includes a receiver at a minimum, and a transmitting device includes a transmitter at a minimum. However, in some embodiments, the transmitting device and the receiving device may include other elements and/or functionality, for example, as in the case of an embodiment of the receiving device described with respect to FIG. 5 below.

The receiving device 410, the optimal braking profile determination unit 420, the enforcement system 430, the driver communication system 440, and the user override device 450 are located within a vehicle, while the transmitting device and the cumulative wear determination device are located external to the vehicle as described below with respect to FIG. 5.

The receiving device 410 receives information pertinent to wear leveling for road life optimization. Hence, such information can include, but is not limited to, vehicle passage information, road construction and/or maintenance information and/or activities (hereinafter collectively designated as "road maintenance information"), road profile measurements, induction loop data from induction loops embedded in the road segment, and normative road wear profiles relating to expected wear condition for the road segment. This information is then provided to the optimal braking profile determination unit 420 for use in determining an optimal braking profile. We note that other operations may also be encompassed and rendered by the unit 420, such as acceleration, steering, and so forth. The amount of involved operations is dependent on the embodiment and the level of control desired in implementing wear leveling. However, in an embodiment such as that shown and described with respect to FIG. 4, the intent is to use braking as the prevalent means to impart road leveling in accordance with the present principles.

However, in other embodiments, the optimal braking profile determination device can be located external to a vehicle. In such a case, the ultimate determination, as expressed for example, in terms of one or more braking locations and an amount of braking (and/or other parameters, as readily determined by one of ordinary skill in the art given the teachings of the present principles provided herein), can be determined remotely from the vehicle and then provided to the vehicle through the receiving device 410. In such a configuration, the receiving device 410 is connected directly to the enforcement system 430 and the driver communication system 440.

In the embodiment of FIG. 4, the receiving device 410 is shown as part of the optimal braking profile determination unit 420. However, in other embodiments, the receiving device 410 may be a separate element connected to the optimal braking profile determination unit 420.

The enforcement system 430 is integrated with existing vehicle systems/functions (not shown) such as, but not limited to, braking (and/or acceleration, etc.) in order to implement the desired driving pattern. In this way, the desired driving pattern could be implemented essentially without driver intervention. Of course, driver overrides can be provided to ensure a human always has the ultimate control over the vehicle. To that end, a user override system 450 is provided to override any automatic control of the vehicle, should the same be necessary as determined by the vehicle operator.

The driver communication device 440 provides the driver with the status of the desired driving pattern, so that the driver is aware of what actions the vehicle is to take as determined by the optimal braking profile determination unit 420. In this way, the driver is afforded an opportunity to counter an automatic action via the user override system 450 by knowing the action that is to occur via the driver communication device 440 and affording a reasonable reaction time to counter the same via the user override system 450.

The transmitting device can be located at a central station or location, or can include one or more transmitting devices located road-side and/or so forth. FIG. 5 shows one exemplary implementation of a transmitting device capable of being used in accordance with the teachings of the present principles, as well as cumulative wear determination device.

A description of an embodiment of the present principles incorporating a heads up display (HUD) will now be given. A HUD is a mechanism for communicating information to the driver in the form of an image projected onto a vehicle windscreen. This creates a form of augmented reality. A HUD could enable the dissemination of data retrieved through digital assignment. The HUD would indicate to the driver the optimal braking position. In one embodiment, it would remain the responsibility of the driver to actually achieve this profile (i.e., desired driving pattern). In such an embodiment, the enforcement system 430 of FIG. 4 can be omitted, with the driver being tasked with making the necessary corrections. In another embodiment, the enforcement system 430 can make the necessary corrections, with the HUD used to indicate the corrections to the driver in real-time or prior to implementation. In an embodiment, the HUD can be part of the driver communication device 440.

Figure 5:
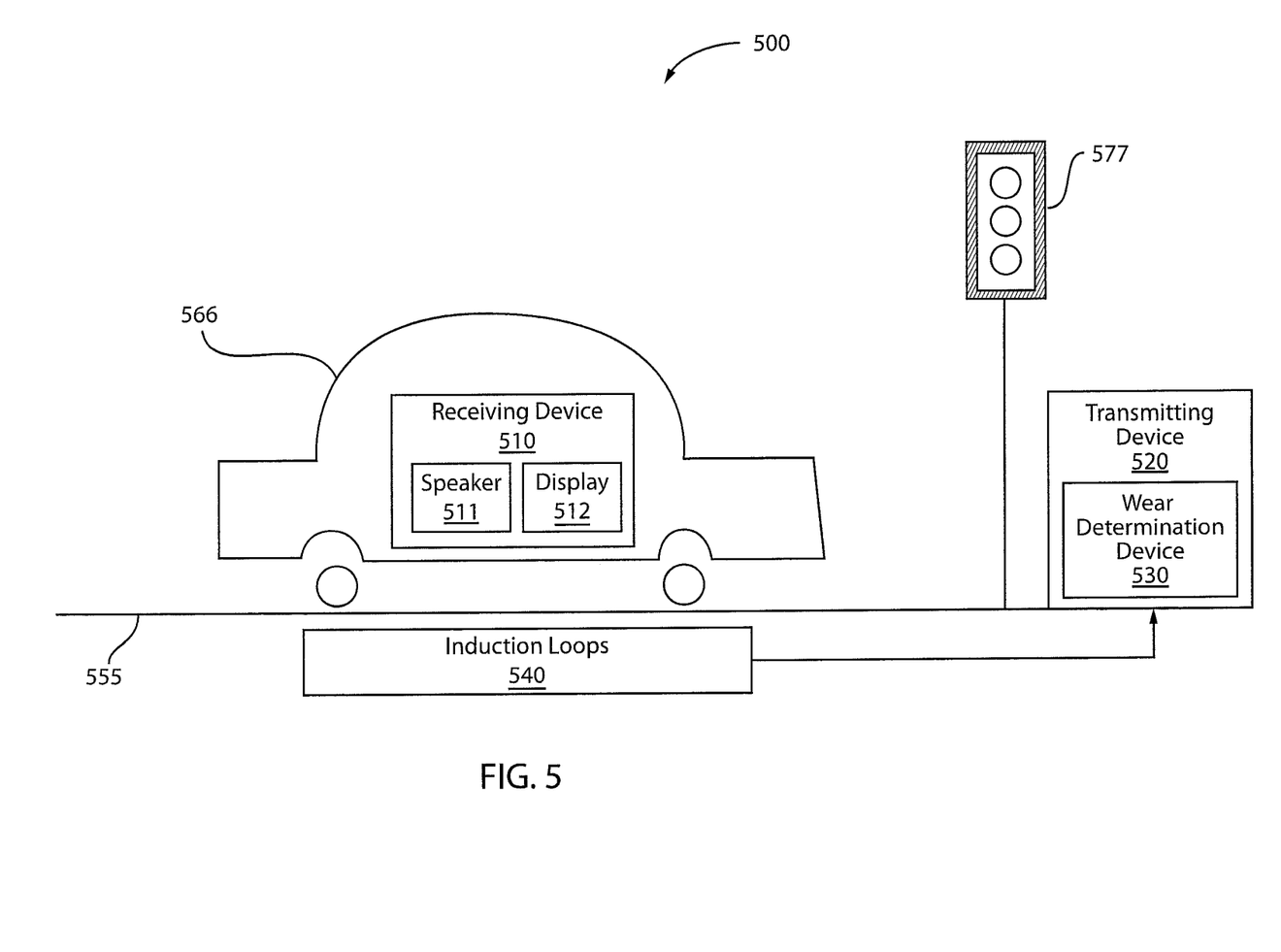
FIG. 5 shows another exemplary system 500 for wear leveling for road life optimization, in accordance with an embodiment of the present principles.

FIG. 5 shows another exemplary system 500 for wear leveling for road life optimization, in accordance with an embodiment of the present principles. The system 500 includes a receiving device 510, a transmitting device 520, and a cumulative wear determination device 530. In the embodiment of FIG. 5, the cumulative wear determination device 530 is included in the transmitter device 520. In other embodiments, the cumulative wear determination device 530 and the transmitting device 520 may be implemented as separate elements.

The receiving device 510 can be a mobile device carried by a person or can be fixed device installed in a vehicle 566. In an embodiment, the receiving device 510 can be an existing device having another purpose including, for example, a mobile telephone. These and other devices in which the receiving device can be incorporated are readily determined by one of ordinary skill in the art, given the teachings of the present principles provided herein.

The receiving device 510 may communicate the relevant information to a vehicle driver using, for example, a speaker 511 and a display (e.g., a heads up display). For example, one vibration pattern may indicate to the driver to slow down, while another vibration pattern may indicate to the driver to speed up. We note that most current mobile telephones include all of the preceding technology and components capable of implementing the receiving device 510 as described above. The same is of some personal digital assistants, tablets, laptops, and so forth, as readily contemplated by one of ordinary skill in the art. Given the teachings of the present principles provided herein, one of ordinary skill in the art will contemplate these and various other devices in which the present principles can be applied, while maintaining the spirit of the present principles.

The transmitting device 520 can be located at a central station or central location, or can be implemented as one or more transmitting devices 520 located a road-side, for example, near a traffic control device 577. The transmitting device 520 is connected to the cumulative wear determination device 530 and transmits signals to level such wear based on information provided by the cumulative wear determination device 530. The cumulative wear determination device 530 may include, involve, and/or otherwise be connected to, for example, induction loops 540 embedded in the road segment 555 and/or other technology and/or information (e.g., normative wear profiles, and so forth) as described herein. While a wired connection is shown between the induction loops 540 and the cumulative wear determination device 530, in other embodiments, a wireless connection can be used. Such connection options are applicable to any of the elements employed in accordance with the present principles.

A description of an embodiment of the present principles incorporating on-street lighting (e.g., embedded light emitting diodes) will now be given. In an embodiment, we communicate the optimal braking profile to drivers in the form of on-street lighting. For example, a strip of red (or some other color) LEDs could be embedded in the road. Segments of this strip can be independently controlled to specify the exact region where braking should begin. In such an embodiment, a driver is tasked with complying with the desired driving pattern.

Figure 6:
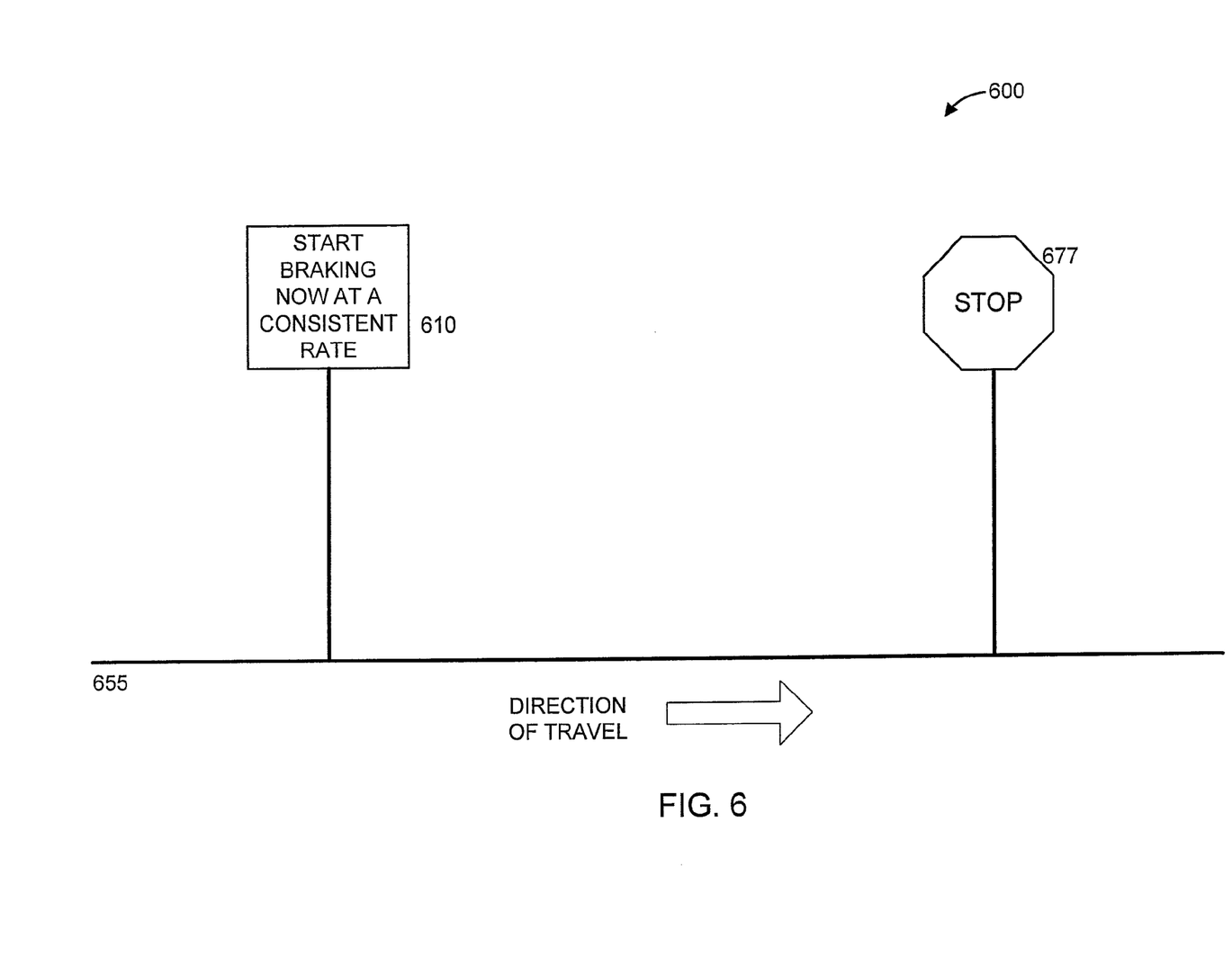
FIG. 6 shows yet another exemplary system 600 for wear leveling for road life optimization, in accordance with an embodiment of the present principles.

FIG. 6 shows yet another exemplary system 600 for wear leveling for road life optimization, in accordance with an embodiment of the present principles. The system 600 includes a velocity change point location indicator 610. The velocity change point location indicator 610 can be include one or more signs, one or more lights (e.g., embedded LEDS as described below with respect to FIG. 7), and/or one or more electronic devices having displays for indicating a desired action (e.g., but not limited to braking) to be taken by a driver and/or a desired location to commence a desired action. Such velocity change point location indicator 610 is located near, for example, a traffic control device 677 at a given road segment 655. In this way, the vehicle itself does not require any modification or equipment in order to implement the present principles.

Figure 7:
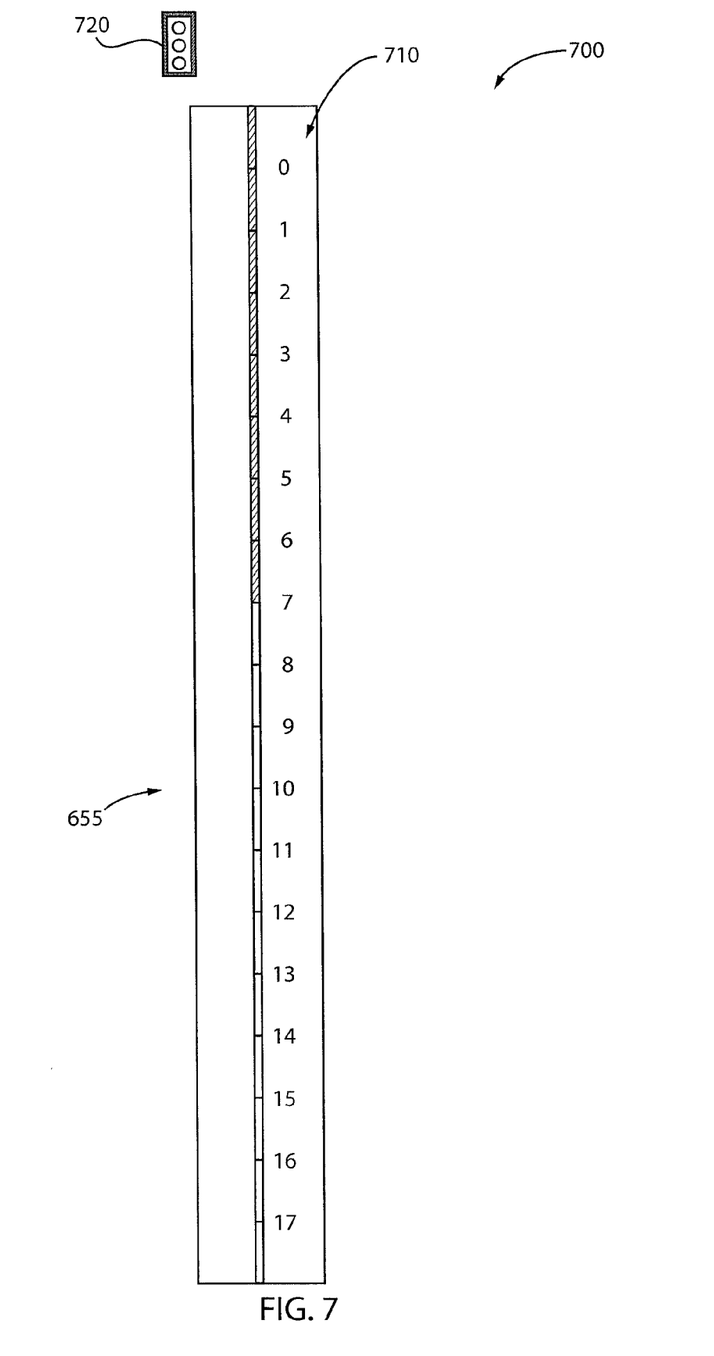
FIG. 7 shows an exemplary on-street lighting system 700 for wear leveling for road life optimization, in accordance with an embodiment of the present principles.

FIG. 7 shows an exemplary on-street lighting system 700 for wear leveling for road life optimization, in accordance with an embodiment of the present principles. The system 700 can be incorporated, for example, as part of system 500 of FIG. 5 or part of system 600 of FIG. 6. The on-street lighting system 700 includes one or more lights (17 lights in the embodiment of FIG. 7) 710 embedded within or proximate to a corresponding road segment 655 and traffic control signal 720. In a preferred embodiment, the one or more lights 710 include a segment of lights such as LEDs.

Figure 8:
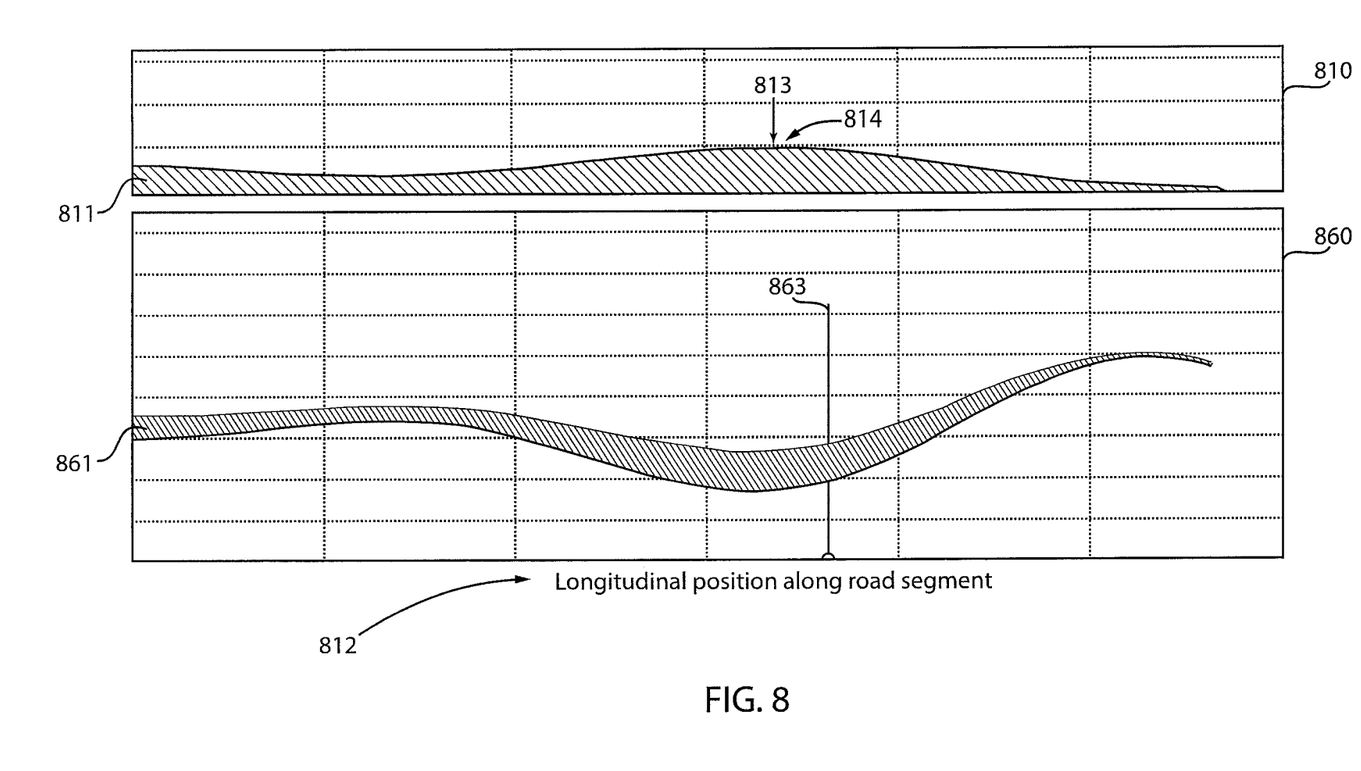
FIG. 8 shows two related graphs representing an advantage of the present principles in shifting the wear profile, in accordance with an embodiment of the present principles.

In the following preferred embodiment we show an optimization formulation which can be used to select the optimal location of a velocity change point. The frequency with which such a method would be executed depends on the volume of traffic passing over that segment. We again refer to FIG. 1, which shows two related graphs representing the current practice of allowing wear to build up in one area. In contrast, FIG. 8 shows two related graphs representing an advantage of the present principles in shifting the wear profile, in accordance with an embodiment of the present principles. In particular, the wear profile is shifted so that it fills the trough in the cumulative wear on the road. The first graph 810 shows the nominal incremental wear profile 811 versus the longitudinal position along the road segment 812, as well as the peak wear 813. The second graph 860 shows the cumulative wear profile 861 versus the longitudinal position along the road segment 812, as well as a traffic signal 863 which essentially results in the peak wear 813 at the shown location 814 in the first graph 810.

In the next embodiment, we describe an alternative approach which avoids the need for optimization. The previously described embodiments can be physically realized in a number of ways. The physical realization will determine the frequency of changes and the granularity of variations.

A description of various ways in which to communicate a velocity change point location will now be given.

On the onset, we note that the way in which the new velocity change point location is communicated to vehicles is not fixed for the present principles. In an embodiment, communication of a new velocity change point location can be achieved by physically moving a sign post between any number of positions along the road. It is noted that in the case of stop signs, the final stopping point should not change, but rather the point at which vehicles are requested to begin braking can change.

Another means of communicating this change would be through electronic signs either on the road or beside it. This would enable easy changes to the location. However, the cost of installing such a system may not be justified by its benefits over a more manual approach.

A third means of communicating velocity change point locations would be though in-vehicle displays connected via some network interface to the local area controller. Such a system would integrate into a variety of other "smart transport" frameworks.

A description of the means by which we determined cumulative wear will now be given.

The first option would be to estimate it based on loop data (induction loops embedded in the road) which tells you the number of vehicle passes. This data combined with normative wear profiles would be sufficient to produce an estimate. The second option would be to periodically measure the wear. There are a variety of well-established techniques for this process being employed presently by road and traffic authorities around the world. Examples include, but are not limited to, Inertial Laser Profilometry and the Merlindevice.

A preferred embodiment of the present principles will now be described.

Let W (x) be the cumulative wear function, which varies along the length of the road segment. Let s be the position of a traffic signal which prompts a velocity change. This is the variable which we will use to modify driver behavior.

A normal vehicle drive profile can be represented as a 3-dimensional vector as follows:

$$p(t) = \begin{bmatrix} x(t) \\ \dot{x}(t) \\ \ddot{x}(t) \end{bmatrix} \quad (1)$$

where x(t) is the position at time t and the first and second derivatives are the velocity and acceleration respectively. The vehicle drive profile varies with the traffic signal location, ceteris paribus, as follows:

$$p(t) = \Psi(s) \quad (2)$$

The incremental wear w(x) due to the passage of a vehicle is a function of its drive profile as follows:

$$w(x) = \phi(p(t)) \quad (3)$$

If $W_0(x)$ is the initial cumulative wear function, then the new cumulative wear function is as follows:

$$W(x) = W_0(x) + w(x) \quad (4)$$

We select the traffic signal location s so as to maximize the 'time to repair' for the road segment. This is achieved by minimizing the difference between maximally and minimally worn regions as follows:

$$\min z = W_{max} - W_{min} \quad (5)$$

where $W_{max} \geq W(x) \forall x$ and $W_{min} \leq W(x) \forall x$

Figure 9:
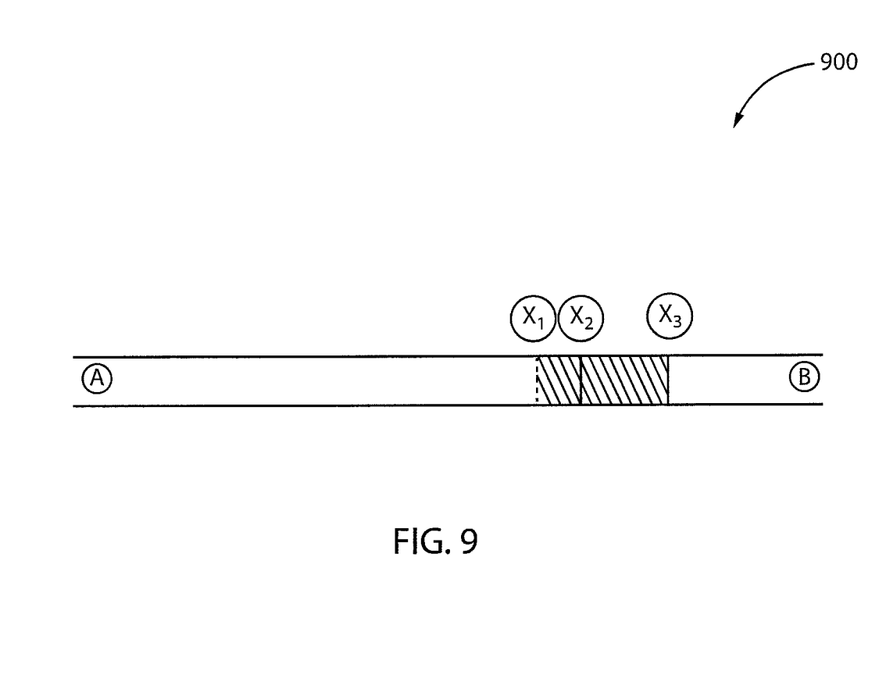
FIG. 9 shows discrete wear leveling 900, in accordance with an alternate embodiment of the present principles.

An alternate embodiment of the present principles will now be described. FIG. 9 shows discrete wear leveling 900, in accordance with an alternate embodiment of the present principles. In the embodiment of FIG. 9, a vehicle is traveling from point A to point B, wherein points $X_1$, $X_2$, and $X_3$ are possible locations for velocity change points, for example, as possibly indicated by signs and/or so forth.

Let $X_c$ be the current velocity change point as follows:

$$X_c \leftarrow X_3$$

Let W be a wear threshold. Let $w_i$ be the present wear at point i,
if $w_3 \geq W$ then $$X_c \leftarrow X_1$$

end if

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A road wear leveling method, comprising:
    determining, using a velocity change point determining unit or a receiving device, a location of a velocity change point based on wear leveling information for a road segment including the location; and
    communicating, using at least one of one or more external location indicating devices and one or more internal location indicating devices with respect to the vehicle, the location of the velocity change point to a vehicle,
    wherein the method is performed for a fixed and single traversal path with respect to the road segment.

2. The road wear leveling method of claim 1, further comprising controlling, selectively using an enforcement system, one or more vehicle functions in accordance with the location of the velocity change point.

3. The road wear leveling method of claim 2, wherein the one or more vehicle functions comprise vehicle braking.

4. The road wear leveling method of claim 1, wherein the location of the velocity change point is determined so as to maximize an interval between two repairs.

5. The road wear leveling method of claim 4, wherein the time to repair the road segment is maximized by minimizing a difference between maximally and minimally worn regions of the road segment.

6. The road wear leveling method of claim 1, wherein said communicating step comprises arranging one or more road signs or lights to indicate at least a starting point for implementing a velocity change.

7. The road wear leveling method of claim 6, wherein an arrangement of the one or more road signs or lights is configured so as to maximize an interval between two repairs.

8. The road wear leveling method of claim 6, wherein the one or more road signs comprise at least one of non-electronic road signs and electronic road signs.

9. The road wear leveling method of claim 1, wherein said communicating step comprises providing an in-vehicle indication of the location of the velocity change point.

10. The road wear leveling method of claim 1, wherein said determining step uses induction loop data from induction loops embedded in the road segment.

11. The road wear leveling method of claim 1, wherein said determining step uses normative road wear profiles relating to expected wear condition for the road segment.

12. The road wear leveling method of claim 1, wherein said determining step uses at least one of vehicle passage information, road maintenance information, and road profile measurements.

13. A road wear leveling system for performing a road wear leveling method, the system comprising:
    a velocity change point determining unit for determining a location of a velocity change point based on wear leveling information for a road segment including the location; and
    a communication system for communicating the location of the velocity change point to a driver of the vehicle,
    wherein the method is performed for a fixed and single traversal path with respect to the road segment.

14. The road wear leveling system of claim 13, wherein the velocity change point determining unit and the communication system are located externally with respect to the vehicle.

15. The road wear leveling system of claim 14, wherein the communication system comprises one or more road signs or lights arranged to indicate at least a starting point for implementing a velocity change.

16. The road wear leveling system of claim 15, wherein an arrangement of the one or more road signs or lights is configured so as to maximize an interval between two repairs.

17. The road wear leveling system of claim 15, wherein the one or more road signs comprise at least one of non-electronic road signs and electronic road signs.

18. The road wear leveling system of claim 15, wherein the one or more road lights comprise one or more light emitting diodes embedded in the road segment.

19. The road wear leveling system of claim 14, wherein the communication system comprises a heads up display.

20. The road wear leveling system of claim 13, wherein the velocity change point determining unit and the communication system are located within the vehicle.

21. The road wear leveling system of claim 20, further comprising an in-vehicle enforcement system connected to one or more vehicle systems for implementing a velocity change at the determined location.

22. The road wear leveling system of claim 21, further comprising an override system configured to allow a driver to override the enforcement system.

23. A road wear leveling method, comprising:
    receiving, using a receiving device, at least one of vehicle passage information, road maintenance information, road profile measurements, induction loop data from induction loops embedded in the road segment, and normative road wear profiles relating to expected wear condition for the road segment;
    determining, using a velocity change point determining unit, a location of a velocity change point based on wear leveling information for a road segment including the location, the wear leveling information determined responsive to said receiving step;
    controlling, selectively using an enforcement system, one or more vehicle functions in accordance with the location of the velocity change point,
    wherein the method is performed for a fixed and single traversal path with respect to the road segment.

24. A road wear leveling method of claim 23, further comprising communicating, using at least one of one or more external location indicating devices and one or more internal location indicating devices with respect to the vehicle, the location of the velocity change point to a driver of the vehicle.

25. A road wear leveling system for performing a road wear leveling method, the system comprising:
    a receiving device for receiving at least one of vehicle passage information, road maintenance information, road profile measurements, induction loop data from induction loops embedded in the road segment, and normative road wear profiles relating to expected wear condition for the road segment;
a velocity change point determining unit for determining a location of a velocity change point based on wear leveling information for a road segment including the location, the wear leveling information determined responsive to an output of said receiving device; and
an in-vehicle enforcement system connected to one or more vehicle systems for implementing a velocity change at the determined location,
wherein the method is performed for a fixed and single traversal path with respect to the road segment.

* * * * *